United States Patent [19]
Raetz et al.

[11] Patent Number: 5,093,999
[45] Date of Patent: Mar. 10, 1992

[54] VEGETATION CUTTING TOOL AND METHOD OF MANUFACTURE

[75] Inventors: Kenneth P. Raetz; Kenneth E. Neuschwanger; Charles R. Klyzek; Encho J. Kuzarov, all of Milwaukie, Oreg.

[73] Assignee: Blount, Inc., Portland, Oreg.

[21] Appl. No.: 546,428

[22] Filed: Jun. 29, 1990

[51] Int. Cl.$^5$ .................................. B26B 15/00
[52] U.S. Cl. ...................... 30/392; 30/210; 30/223
[58] Field of Search ............ 30/392, 501, 210, 216, 30/223, 228; 76/119, 29, 31

[56] References Cited

U.S. PATENT DOCUMENTS

| | | | |
|---|---|---|---|
| 1,152,531 | 9/1915 | Marshall | 30/223 X |
| 1,644,141 | 10/1927 | McArdle | 30/223 X |
| 3,768,163 | 10/1973 | Weber et al. | 30/138 |
| 4,619,045 | 10/1986 | Mayer | 30/223 X |
| 4,827,616 | 5/1989 | Sistare | 30/392 X |

Primary Examiner—Mark Rosenbaum
Assistant Examiner—Kenneth E. Peterson
Attorney, Agent, or Firm—Robert L. Harrington

[57] ABSTRACT

A hedge trimming tool having a fixed elongated blade mounted to the power head of the tool and a cutting blade mounted over the fixed blade and reciprocating relative to the fixed blade in the direction of the lengthwise axis. A leading side of the fixed blade has projecting fingers or teeth and the overlying portion of the cutting blade has projecting teeth that reciprocate across the openings between the fingers. The reciprocating teeth have sides configured in a complex curve forming an hour glass planar profile and an inverted U-shaped cross section. The U-shaped cross section is provided by curving the sides of the teeth downwardly whereby the teeth sides are angularly projected through the plane defined by the bottom surface of the blade. The cutting edges along the sides are formed by grinding faces through the portions of the teeth projected below the bottom surface of the blade. The faces are formed in a single pass of the grinding implement with the faces parallel to the bottom surface of the blade.

5 Claims, 3 Drawing Sheets

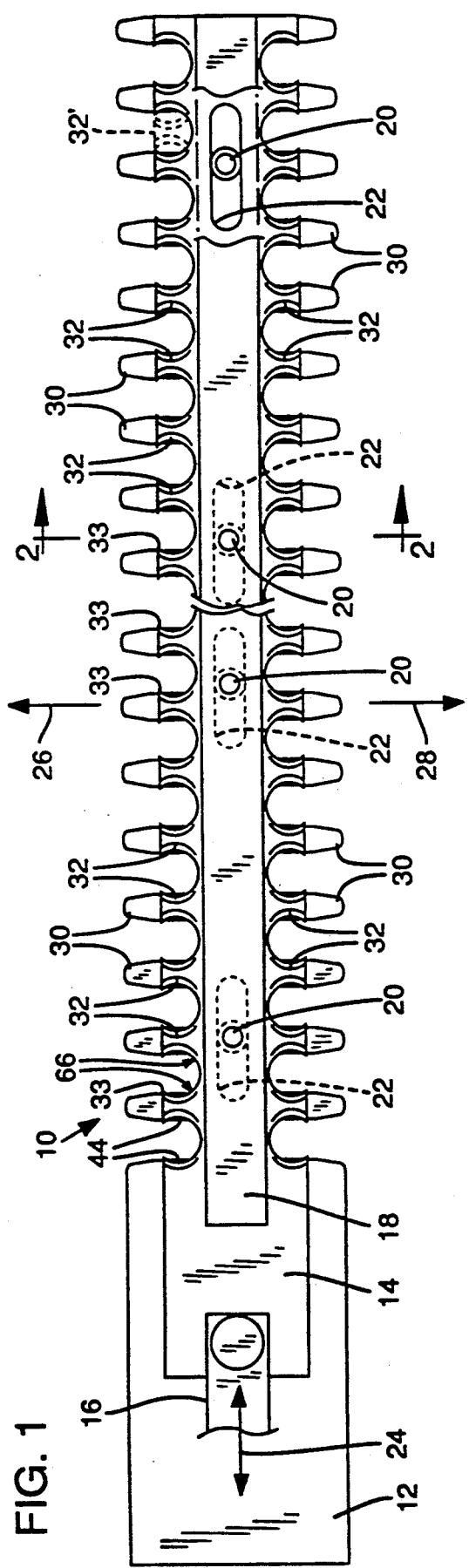
FIG. 1
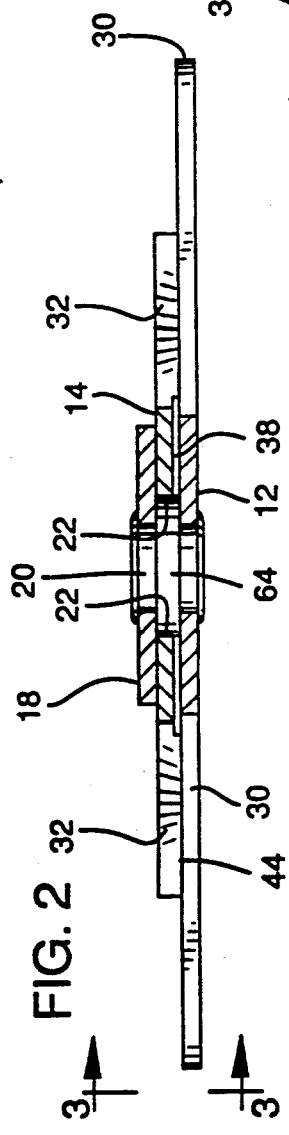
FIG. 2
FIG. 3

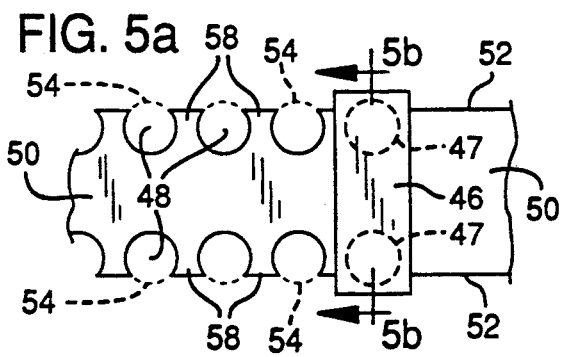
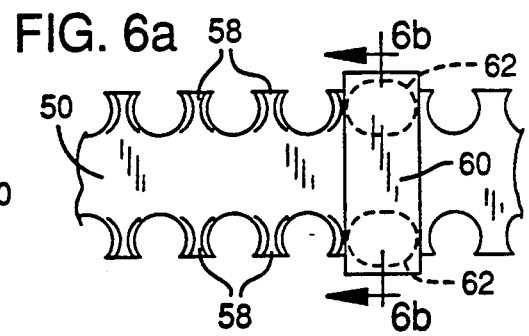
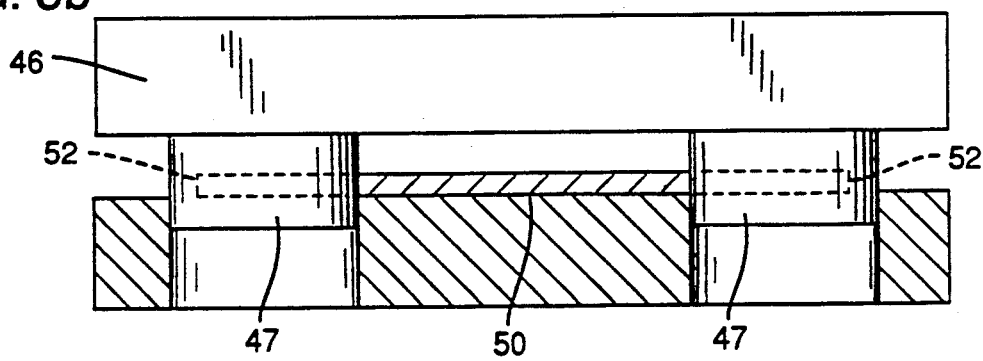
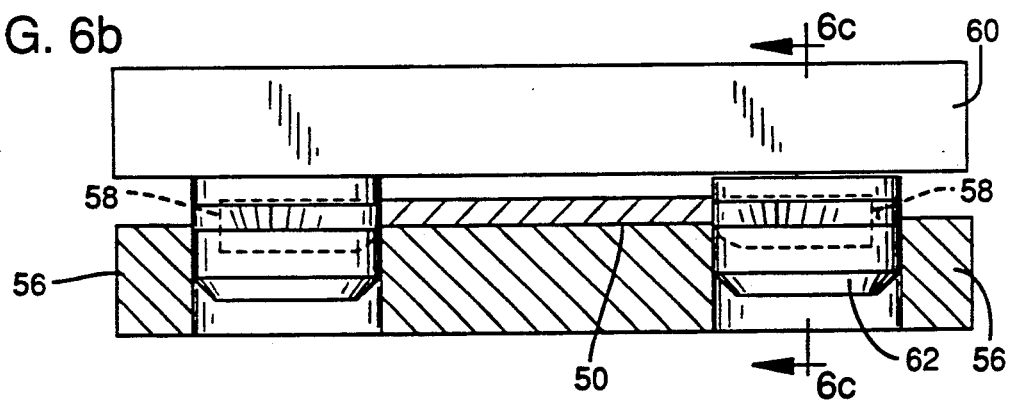
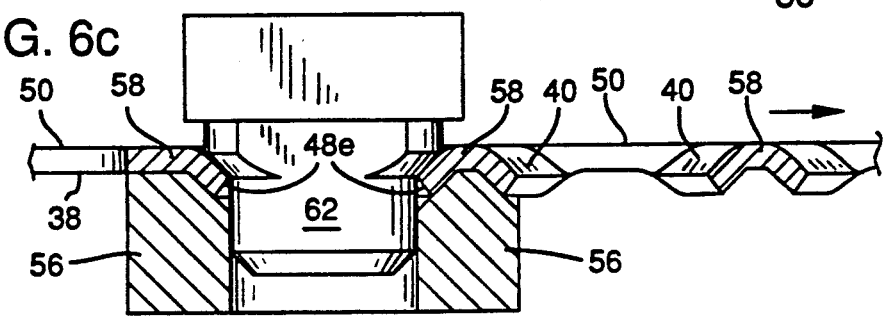
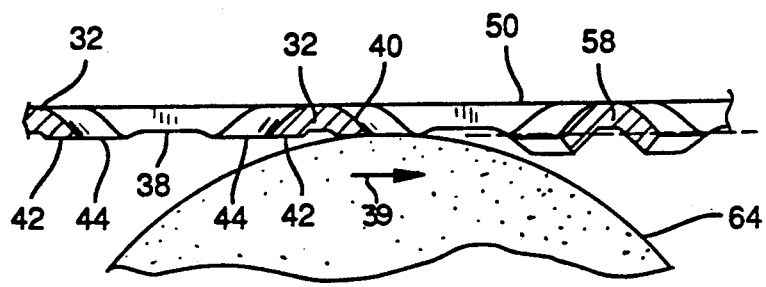

VEGETATION CUTTING TOOL AND METHOD OF MANUFACTURE

FIELD OF THE INVENTION

This invention relates to vegetation cutting tools, having reciprocating teeth such as used for trimming hedges, and more particularly it relates to a cutting blade of the tool having teeth that are configured for effective cutting and easy manufacture.

BACKGROUND OF THE INVENTION

Hedge trimming tools are required to cut vegetation ranging from small limbs, e.g. three-eighth inch diameter, down to the size of leaf stems. The conventional hedge trimming tool to which this invention is directed includes an elongated fixed blade with forwardly projected teeth and an overlying cutting blade reciprocally mounted to the fixed blade. Cutting teeth carried by the overlying cutting blade are projected over the teeth of the fixed blade and reciprocate back and forth across the spacing between the fixed blade teeth. The tool is directed into or along the hedge and as vegetation enters the space between the fixed blade teeth, it is severed by the reciprocating teeth.

Forming the teeth of the overlying cutting blade is a primary consideration in the manufacture of a hedge trimming tool. Heretofore the teeth were produced in what can essentially be considered as a two-step operation. First, holes or openings were made, e.g. by a circular punch driven through the blade thickness at the leading edge of the blade. The holes are formed so as to overlap the leading edge resulting in a scalloped configuration having hour glass configured teeth separated by C-shaped openings.

In the second step of the prior manufacturing process, a frusto conical sharpening tool, rotated on its axis, is projected down into the C-shaped openings to bevel or flare outwardly the blade thickness from the bottom surface to the top surface of the blade. This creates cutting edges along the concave curved sides of the hour glass configured teeth at the bottom surface of the blade. The blade is laid with the bottom surface flat on the fixed blade so that the cutting edges slide over the fixed blade fingers in a scissors-like slicing action.

The concern of this manner of forming the teeth is in the substantial relative cost of forming the cutting edges, i.e. the step of projecting a rotating frusto conical sharpening tool into the C-shaped openings to bevel the blade thickness and thereby form the cutting edges.

THE PRESENT INVENTION

The present invention does away with the conventional practice of forming the cutting edges with a rotating frusto conical sharpening tool. In the preferred embodiment, the same first step is performed to create the hour glass configured teeth separated by C-shaped openings in the leading edges of the blade. The teeth (which are unfinished in this stage of operation) are then curled or curved downwardly on both side edges. This curling operation results in the top surface of the teeth being angularly projected through the plane defined by the bottom surface of the blade. A machining tool is directed along the bottom surface of the blade and in a single machining operation grinds faces through the thickness of the downwardly projected sides of the teeth. The faces form acute angles with the top surfaces of the blade which become the cutting edges.

Whereas in the present invention two operations are required to produce the desired cutting edges they are accomplished in but a fraction of the time previously required by the process of sharpening with the frusto conical sharpening tool. Furthermore, it is desirable to offset the forces of the cutting edges below the bottom surface of the blade. This reduces the surface-to-surface contact between the blades which in turn reduces friction. Also, the configuration offers the potential of easy resharpening.

These and other benefits will be apparent upon reference to the following detailed description and drawings referred to therein.

DESCRIPTION OF THE DRAWINGS

FIG. 1 is a top view illustrating a hedge trimming tool in accordance with the present invention;

FIG. 2 is an enlarged section view taken on view line 2—2 of FIG. 1;

FIG. 3 is a partial side view as taken on view line 3—3 of FIG. 2;

FIGS. 5a and 5b illustrate the hole forming step used in producing the cutting blade of FIG. 4;

FIGS. 6a, 6b and 6c illustrate the edge curling step in producing the cutting blade of FIG. 4; and FIG. 7 illustrates the edge sharpening step in producing the cutting blade of FIG. 4.

Figure 4:
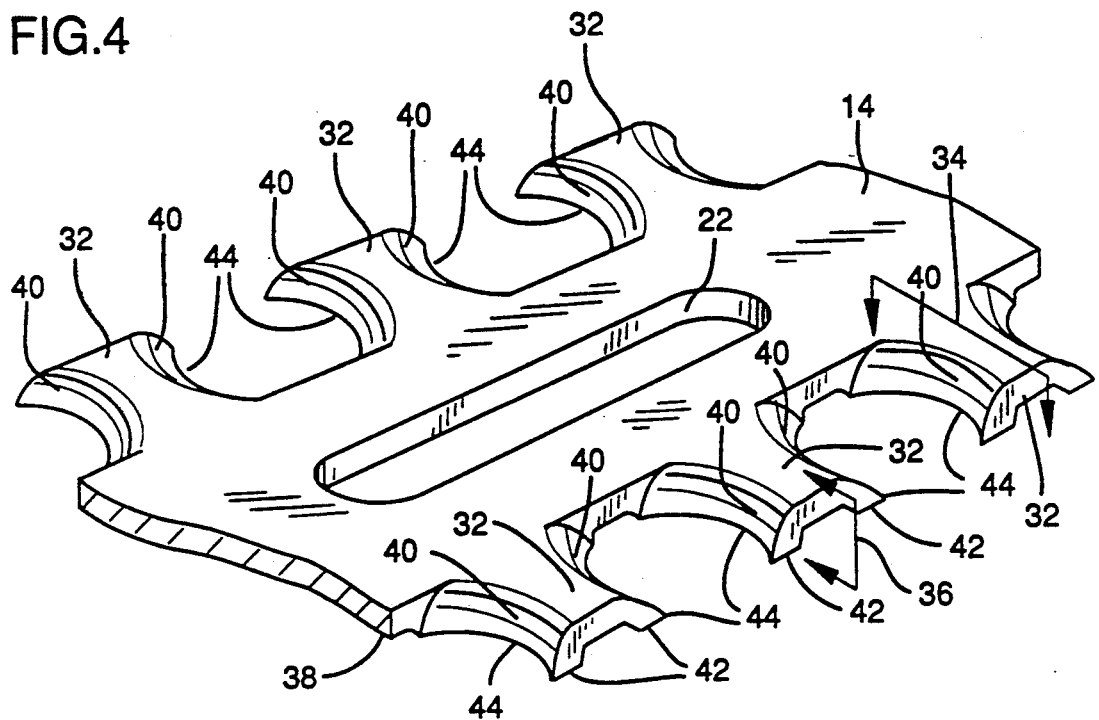
FIG. 4 is an enlarged perspective view of a section of the cutting blade of the tool illustrated in FIGS. 1–4 and FIGS. 4a and 4b are provided to illustrate and assist explanation of the manner of forming the complexly curved cutting edge illustrated perspectively in FIG. 4.

Reference is made to FIGS. 1–3. Illustrated in FIG. 1 is a hedge trimming tool 10 that is adapted to be mounted to a power head (not shown). A bottom blade 12 of the tool 10 is fixedly mounted to the power head. A cutting blade 14 overlies the fixed blade 12 and is coupled to the power head's output shaft as represented by coupling arm 16. A flat holding bar 18 is secured to the fixed blade 12 by rivets 20. Slots 22 in the cutting blade 14 allow the cutting blade 14 to reciprocate relative to the fixed blade 12 and holding bar 18 a indicated by arrows 24. Reciprocation of cutting blade 14 is provided by the output shaft of the power head coupled to the cutting blade 14 (indicated in the drawing as coupling 16).

The hedge trimming tool 10 is operated to direct the tool in a sweeping action in either of the directions indicated by arrows 26 and 28. Whereas the tool can be constructed to function in one or the other of the directions 26, 28, typically for convenience and versatility the tool is designed to function in both directions as illustrated. Hereafter when reference is made to the leading edge of the tool or its components, i.e. the leading edge of fixed blade 12 or reciprocating blade 14, it will be understood that the term has reference to the direction of operation and includes one or both leading edges determined by the arrows 26, 28.

As can be seen in FIG. 1, the fixed bottom blade 12 is scalloped along its leading edge to produce forwardly directed fingers or teeth 30. These teeth are spaced apart a distance to receive therebetween the maximum thickness of branches of a hedge to be trimmed, e.g. three-eighth inch. The reciprocating blade 14 is scalloped along its leading edge in a manner to produce cutting teeth 32 (described in detail hereafter). These teeth 32 reciprocate between a retracted position with the teeth 32 overlying the teeth 30 (shown in solid lines), and in a closed position with the teeth 32 positioned between the teeth 30 (as illustrated in dash lines designated 32' the upper right end of FIG. 1). It will be understood that branches (less than three-eighth inch diameter), twigs, leaves and the like slide into the spaces between teeth 30 and then into the opening between the cutting teeth 32, (i.e. with the cutting teeth reciprocated to the retracted position). The teeth 32 close across the opening (position 32') with the tips 33 of the cutting teeth first hooking and drawing the materials into the opening. Continued movement of the teeth 32 across the opening, in cooperation with the opposed stationary teeth 30, slices through and severs the material. Several cycles of reciprocation may be required to sever the larger branches. However, the reciprocation is very rapid and the operator "feel" is uninterrupted.

All of the above written description is as applicable to prior hedge trimming tools as it is to the illustrated tool of the present invention. The improvement provided by this invention is principally embodied in the production of the teeth of the reciprocating cutting blade and to a lesser degree, the operational benefit resulting from reduced friction.

The teeth 32 of cutting blade 14 are formed out of complex curves which can best be seen from the perspective view of FIG. 4. Consider first the shape of the tooth when viewed from the top down as indicated by view line 34 in FIG. 4 and as seen in the plan view FIG. 1. The teeth 32 of the blade 14 as shown in FIG. 1 at the upper left end have cutting edges 44 that generate a top view profile of the teeth that is relatively wide at the inner end 66 and outer tip 33 and relatively narrow across the middle to produce the hour glass shape.

Figure 4A:
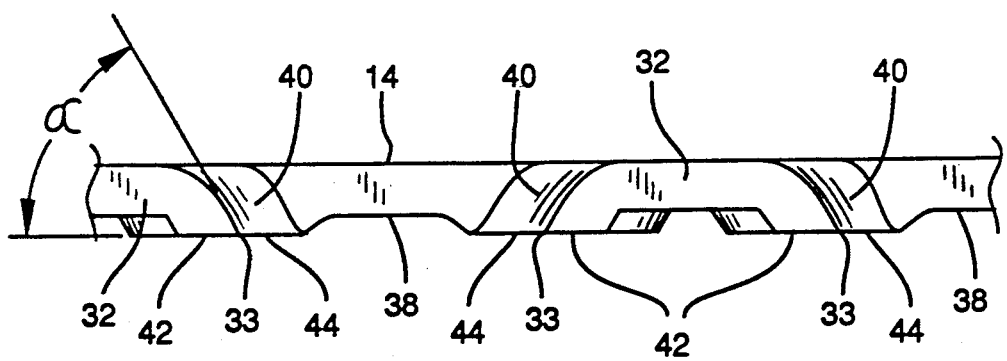

Referring now to FIGS. 4 and 4a, the teeth viewed from the end as indicated by view line 36, take on the shape of an inverted U. This is the result of the sides of the cutting teeth being curved downwardly. The operation that forms this U shape curve is illustrated in FIG. 6c. The teeth are bowed, i.e. the teeth sides are curved downward so that the full blade thickness is projected angularly downwardly through the plane that is defined by the bottom surface 38 of the blade. (See FIG. 6c at 48e.)

With reference to FIGS. 4a and 7, because the top surfaces 40 of the teeth segments are projected at an angle to the planar body of the blade, the depending sides of the teeth can be ground off parallel to bottom surface 38 (arrow 39 of FIG. 7) to form bottom teeth faces 42. The included acute angle $a$ between faces 42 and top surface 40 in FIG. 4a produces the cutting edge 44.

The advantages are primarily advantages in the production of the blade, but structural advantages are achieved as well. Note that the faces 42 are slightly below bottom surface 38 of the blade. These faces 42 are the only surfaces contacting and sliding on the top surface of fixed blade 12. The total contact surface is thereby a fraction of the contact surface which would occur if the full bottom surface of the cutting blade were to ride on the fixed blade 12 (as in prior hedge trimming tools) and the frictional resistance to the reciprocating action of the blade 14 is significantly reduced.

Figure 4B:
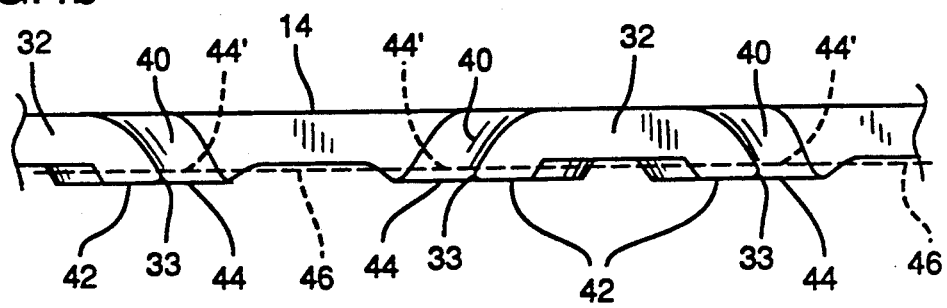

A further advantage that is conceived for this tooth configuration is that the cutting edge 44 can be resharpened. See FIG. 4b wherein the cutting edge 44 is shown rounded as when worn. A resharpening media applied against the faces 42 will result in the partial removal of the faces 42 as indicated by dash lines 46 to generate a resharpened cutting edge at the location of the reduced faces 42 as indicated at 44'. This sharpening media can be a tool applied against the blade bottom following disassembly of the blade from the fixed blade, or it can be an aggregate strip or even a slurry of aggregate that is inserted between the blades. The tool is operated to reciprocate the blades for automatic or self sharpening.

As previously indicated, the primary benefit of the tooth configuration of the invention is in the simplified production of the blade. The steps of production are illustrated in FIGS. 5-7.

FIGS. 5a and 5b schematically illustrate the traditional first step wherein a die punch 46 having circular die cutters 47 punches circular holes 48 along both side edges 52 of a metal strip 50. (The metal strip was previously cut to size, e.g. $0.070 \times 1.69 \times 24$ inches, from a roll of metal sheet material, e.g. 24 inches wide 0.070 inches thick and many feet long.) The die punch 46 overlaps the edges 52 as indicated by the dash lines 54 in FIG. 5a to form an open sided C-shaped opening 48. (As explained previously, in prior production processes, it is at this point that a frusto conical sharpening tool would be forced down through each hole or opening 48 to bevel the thickness of the strip upwardly and outwardly to form the sharpened edge coplanar to the bottom surface 38 of the strips.)

The next step, which is a deviation from the prior processes and is unique to this invention, is the step of upsetting, curving or curling the metal at the sides of the teeth, illustrated in FIGS. 6a-6c. FIG. 6c is a cross section as will be apparent from noting the view lines of FIGS. 6b and 6a. As will be most apparent from FIG. 6c, anvils 56 are positioned under the metal strip 58 between the holes 48. A forming tool 60 includes configured plungers 62. The plungers 62 are forced down through the openings 48 as illustrated in FIG. 6c to curl or curve the side edges of opening 48 around the anvil 56. It is important to note that this forming step results in the hole edge 48e being forced into a position that is below the planar bottom surface 38 of the body 50.

FIG. 7 illustrates the sharpening step which converts strip 50 to blade 14 and produces the configured cutting teeth 32. A sharpening tool 64 is simply directed along the bottom of the blade in a direction 39, parallel to and spaced slightly below the bottom surface 38 as illustrated. Those skilled in the art will be aware of the many different forms that tool 64 can take and the rotating cylindrical sharpening tool 64 of FIG. 7 is merely a schematic illustration of such tools in general. (In actual practice, the blade is inverted and laid on its top on a work surface and a sharpening tool is passed over the top of the blade bottom 38 to sharpen the teeth.) The movement of the sharpening tool 64 across the blade bottom projects through the teeth sides resulting in the formation of faces 42 and hence cutting edges 44. This final step of course converts the intermediate strip segments or portions 58 into cutting teeth 32.

The bar 18, cutting blade 14 and fixed bar 12 are then assembled into the tool of FIGS. 1-3. As shown in FIG. 2, the rivet 20 is provided with an enlarged diameter center section 64 that spaces the bar 18 from blade 12 to provide free sliding of the cutting blade 14. The faces 42 of the teeth 32 ride on the top surface of the fixed blade teeth 30. The innermost portion of the edge 44 is curved inwardly (as indicated at 66 in FIG. 1) to a greater extent than tip 33 at the outer end of the teeth. The inner curve at 66 functions as a cam surface to maintain the cutting teeth at a level above the top surface of the fingers and insures that the teeth 32 will not project into the spacing between and catch on teeth 30.

As seen in FIG. 1, sliding of the reciprocating blade 14 is permitted by the provision of slots 22 which are parallel to the direction of reciprocating action indicated by arrow 24. It will be appreciated, however, that the two blades 12 and 14 can be reversed whereby cutting blade 14 is fixed to the power head and blade 12 is reciprocated or, as a further alternative, both blades can be reciprocated but in opposite directions.

Those skilled in the art will conceive of other variations and modifications without departing from this invention which is defined in the accompanying claims appended hereto.

We claim:

1. A motor powered vegetation cutting tool comprising;
   a pair of substantially planar blades each having a blade body and a plurality of laterally projected teeth in spaced parallel relation defining a maximum thickness of vegetation material to be cut, said blades lying in superimposed relation, and a coupling that couples the blades to a motor for reciprocating the blades relative to each other whereby the teeth of the blades cooperatively open and close in a scissors-like operation,
   one of said blades being a cutting blade having opposed first and second surfaces having portions that are planar parallel surfaces defining a blade thickness and said projecting teeth being segments that extend from said blade body with sufficient rigidity and strength provided by said blade thickness to cut the vegetation materials permitted entry between said spaced teeth, said teeth being convexly curved relative to said planar portion of said first surface to form a U shape having leg portions with curved outer surfaces that are continuations of said first surface, and which curved surfaces are projected to intersect angularly with respect to the planar portion of said second surface, said leg portions terminating in edge faces, said edge faces coplanar relative to each other and parallel and in close proximity to said second surface and said edge faces forming an acute angle with said curved outer surfaces of said leg portions to define cutting edges for cutting vegetation materials that enter between the teeth,
   said leg portions which terminate in said edge faces being confined to said projecting teeth whereby the teeth can be discriminately sharpened by grinding along the plane of said edge faces and said edge faces maintaining sliding contact with the teeth of the other blade when in use, regardless of intermittent resharpening of said edge faces during the life of the tool.

2. A trimming tool as defined in claim 1 wherein the faces of the cutting teeth are spaced from the second surface of the cutting blade while in close proximity thereto, and wherein said faces engage the other blade of the pair of blades in sliding relationship thereto.

3. A tool as defined in claim 2 wherein each of the teeth are configured as a complex curve forming an hour glass-like planar profile.

4. A tool as defined in claim 3 wherein the complex curve of the teeth form C-shaped openings between the teeth.

5. A tool as defined in claim 2 wherein the spacing of the edge faces below the second surface is sufficient to permit resharpening of the cutting edge by the reduction of that spacing.

* * * * *